Oct. 23, 1962 J. C. FORTIS 3,059,568
PORTABLE ROTISSERIE
Filed June 20, 1958 4 Sheets-Sheet 1

INVENTOR.
JOHN C. FORTIS,
BY
McMorrow, Berman & Davidson
ATTORNEYS.

Oct. 23, 1962 J. C. FORTIS 3,059,568
PORTABLE ROTISSERIE
Filed June 20, 1958 4 Sheets-Sheet 2

INVENTOR.
JOHN C. FORTIS,
BY
McMorrow, Berman + Davidson
ATTORNEYS.

Oct. 23, 1962  J. C. FORTIS  3,059,568
PORTABLE ROTISSERIE
Filed June 20, 1958  4 Sheets-Sheet 3
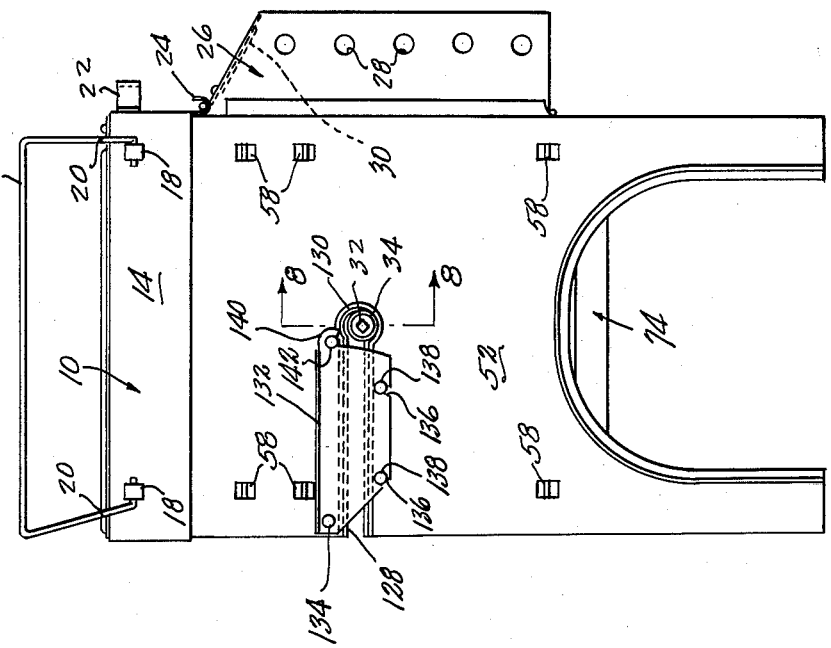
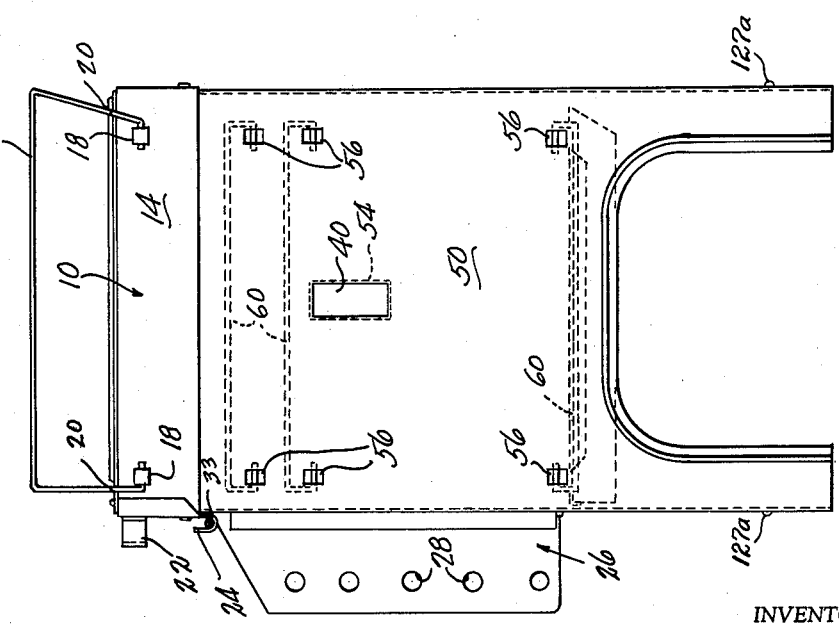
INVENTOR.
JOHN C. FORTIS,
BY
McMorrow, Berman & Davidson
ATTORNEYS.

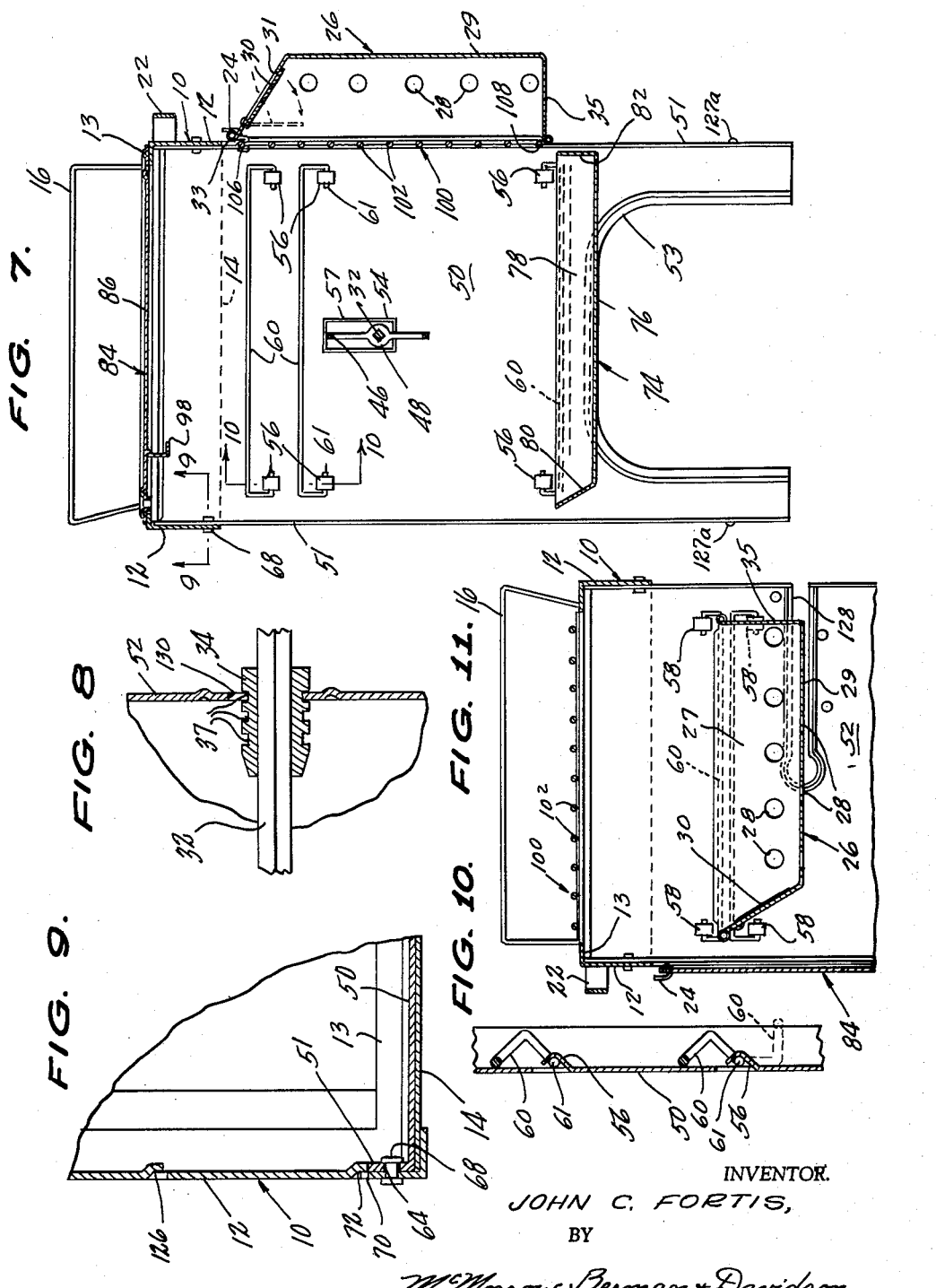

United States Patent Office 3,059,568
Patented Oct. 23, 1962

3,059,568
PORTABLE ROTISSERIE
John C. Fortis, 62 Vreeland Ave., Clifton, N.J.
Filed June 20, 1958, Ser. No. 743,289
1 Claim. (Cl. 99—340)

This invention relates to a portable rotisserie, and more particularly has reference to a device of this type foldable into a compact article when not in use, and designed for use at picnics or outings, without requiring an external source of electrical power, the invention being designed to use power supplied by either a spring-driven or battery-driven motor.

One important object of the present invention is to provide a device which can be used as a conventional picnic grill, and which will be so designed as to cause the temperature of the heat applied to the food being cooked to be accurately controlled by various positions of the fire pan.

Another object is to provide a device of the character stated so designed that a chicken, ham or other food can be barbecued on the rotary spit, while other foods, as for example, vegetables, are at the same time being cooked in a lower pan, with coffee and the like being prepared upon the top pan or plate simultaneously with the barbecuing and cooking of the mentioned foods, a single source of heat such as a bed of hot coals being used for the entire cooking operation.

Another object is to provide a device which will not only permit the top pan, grill, spit rod, and gravy pan to be used simultaneously, but will at the same time facilitate the cooking of a substantial number of food items on the several articles mentioned, by suspending the fire pan in a vertical position. In other words, in many instances it is desired to cook a substantial number of the same kind of foods, as for example, a large number of hamburgers or frankfurters. Ordinarily, outdoor equipment does not permit more than a comparatively small number of these items to be cooked simultaneously, as a result of which the cooking operation is prolonged. According to the present invention, approximately 25 hamburgers or frankfurters, depending upon the size, may be cooked simultaneously.

Another object is to provide a device as stated which will include holders adjustable along the rotary spits to receive various articles, as for example, corn on the cob wrapped in aluminum foil, in a manner such that the articles will all be uniformly, tastily cooked.

Another object is to so form the device that while having a pronounced versatility as compared to prior art devices intended for the same general use, it will at the same time be truly foldable to a very compact, readily portable unit.

Other objects will appear from the following description, the claim appended thereto, and from the annexed drawing, in which like reference characters designate like parts throughout the several views, and wherein:

FIGURE 5 is an end elevational view of the device as seen from the left of FIGURE 4, the motor being removed;

FIGURE 6 is an end elevational view of the device as seen from the right of FIGURE 4, the spit handle being removed;

FIGURE 7 is a transverse sectional view substantially on line 7—7 of FIGURE 4;

FIGURE 8 is an enlarged, detail sectional view showing the bearing means for one end of the spit, taken substantially on line 8—8 of FIGURE 6;

FIGURE 9 is a greatly enlarged, detail sectional view on line 9—9 of FIGURE 7, showing the connection of the foldable legs to the frame and the means for releasably locking the legs in their unfolded or use positions;

FIGURE 10 is an enlarged, detail sectional view on line 10—10 of FIGURE 7, showing the formation and mounting of the hangers, one of the hangers being shown in opposite extreme positions to which the same is movable in full and dotted lines respectively;

FIGURE 11 is a transverse sectional view through the device with the fire pan being supported horizontally upon the legs below a grill supported upon the frame.

Figure 1:
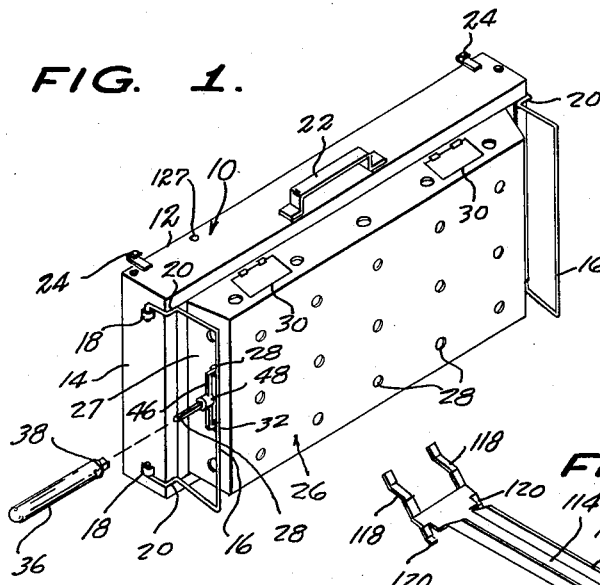
FIGURE 1 is a perspective view, partially exploded, of a portable rotisserie according to the present invention, folded for transportation or storage.

Referring to the drawings in detail, the portable rotisserie comprising the present invention includes a rectangular, sheet metal, open-center frame generally designated 10, having longitudinal or side walls 12 rigid with transverse or end walls 14. Projecting inwardly from the top edges of the several walls, and extending continuously over the full periphery of the frame in a horizontal plane, is a top flange 13.

Bail-type, transversely extending handles 16 of wire material are provided at the opposite ends of the frame, each of these being of a U-shape as shown in FIGURES 5 and 6. Extending inwardly from the opposite ends of each bail are trunnions engaged in outwardly struck bearing sleeves 18 of end walls 14. Each bail (see FIGURE 4) has its opposite legs formed with an offset 20, defining a shoulder on each bail adapted to be engaged against the end portions of the peripheral flange 13 when the handles are raised to facilitate carrying of the device in its unfolded condition. The raised handles, further, serve as guards at opposite ends of the device. Further, when the device is inverted as in FIGURE 2 for folding or unfolding of the same preliminary to its storage or use respectively, the bail-type handles 16 form stands supporting the remaining components of the device out of contact with a supporting surface.

Secured to one of the side walls 12 is a handle 22 (FIGURE 1) for use in carrying the device when it is in its completely folded condition.

Again referring to FIGURE 1, the wall 12 to which handle 22 is attached is provided, at its opposite ends, with upwardly opening suspension hooks 24, projecting downwardly below the bottom edge of the frame.

Generally designated at 26 is a fire pan. This is of rectangular configuration, and in its end walls 27 has openings 28. Openings 28 are also formed in the bottom wall 29 of the fire pan. A pair of hinged gates 30 (FIG- URES 3 and 7) are provided in a steeply inclined side wall 31 of the fire pan, to facilitate insertion of fuel through openings normally closed by said gates, when the fire pan is in use, as for example in the position shown in FIGURE 7.

At the ends of the wall 31, the fire pan has longitudinal projections engaging in the hooks 24. Said projections comprise the opposite end portions of a reinforcing rod 33 about which the adjacent edge portion of the fire pan is rolled.

The side wall opposite the inclined side wall 31 has been designated at 35 and is disposed in a plane perpendicular to the plane of the bottom wall 29 of the fire pan.

Designated at 32 is an elongated spit of square or other non-circular cross section. When the device is folded with all the parts packed for transportation or storage, the spit extends through the fire pan as shown in FIGURE 1, with the ends of the spit projecting through selected openings 28 of the end walls 27. Referring to FIGURE 8, the spit is provided with a ferrule 34, having a series of spaced circumferential grooves 37, said ferrule being disposed adjacent one end of the spit. This end of the spit projects outwardly when the device is in use, in a manner to be described in greater detail hereafter, and is adapted to receive an elongated handle of wood or other heat-insulating material designated at 36 and provided with a set screw 38 adapted to engage the spit. When the device is not in use, the handle is stored in the fire pan.

Figures 3, 4:
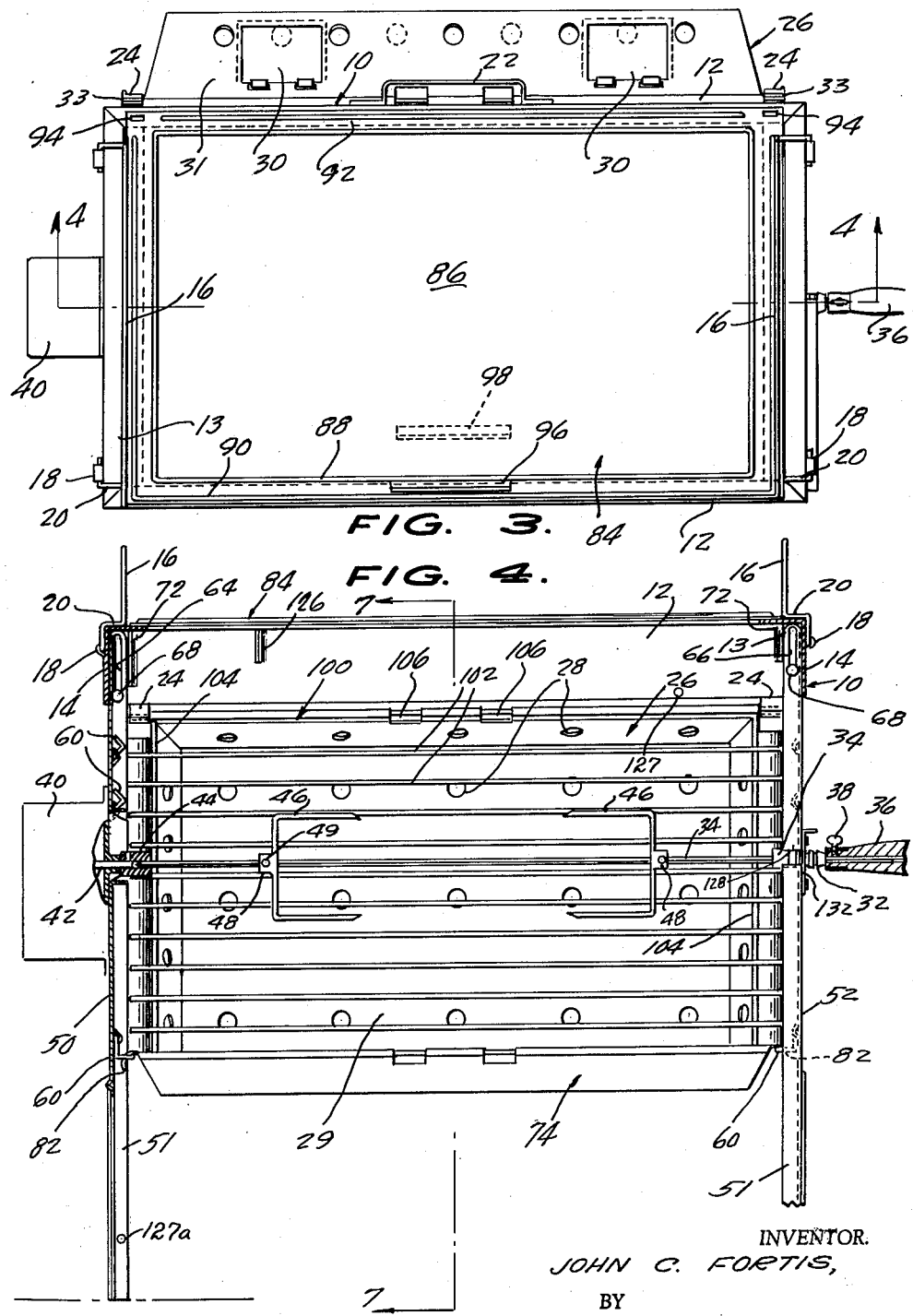
FIGURE 3 is an enlarged top plan view of the rotisserie as it appears with the top pan supported in the top of the frame and the fire pan depending vertically along one side of the device.
FIGURE 4 is a longitudinal sectional view through the device substantially on line 4—4 of FIGURE 3.

Designated at 40 in FIGURE 4 is a battery-driven motor, which is attachable to the adjacent, collapsible legs of the device. Instead of a battery-driven motor, a spring-wound motor could be employed. Since both of these motors are conventional per se, and are known in this particular art, it is not believed necessary to illustrate the details thereof, since the details of the motor construction do not comprise the present invention. It is sufficient to note that regardless of the type of motor that is used, it can be either permanently or detachably connected to the associated collapsible end wall or support leg of the rotisserie, in a position such that the shaft 42 of the motor, driven at a predetermined rate of speed, is engageable in one end of a connecting sleeve 44, in the other end of which the spit end engages, for conjoint rotation of the spit, sleeve 44, and shaft 42.

In a typical arrangement, the motor speed may be controlled by a governor and the spring-driven motor, with one winding, might deliver sufficient power to turn an eight-pound chicken on the spit for approximately forty-five minutes. The battery-driven motor may be powered by two flashlight batteries, providing the same power for approximately three hours.

Intemrediate its ends, the spit carries confronting article support forks 46 each of which is of a U-shape, the distal ends of the legs of each fork being sharpened so as to permit food to be impaled thereon. Integral with the bight portions of the forks are sleeves 48 having set screws 49 fixedly engaging the forks, with the spit in selected positions to which the forks are adjusted longitudinally of the spit. Referring to FIGURE 1, it will be noted that the legs of each fork may extend into openings 28 of the end wall 27 of the fire pan when the device is not in use and the spit is stored in the fire pan.

Figure 2:
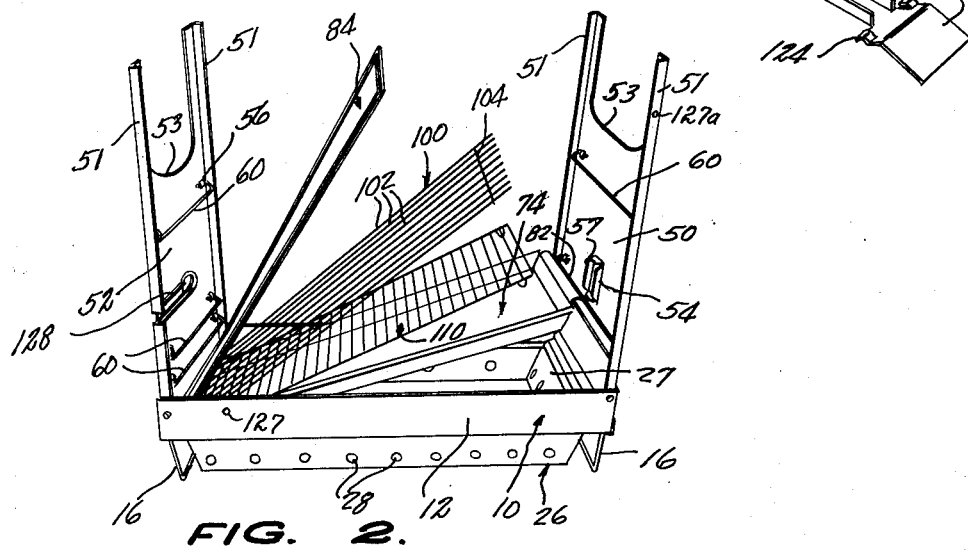
FIGURE 2 is a view of the device opened to show the manner of storage of the various components thereof.

The portable rotisserie comprises, at opposite ends of the frame, collapsible legs 50, 52. Each of these is formed as a sheet of material, so as to confine heat produced in the space between the legs. The legs 50, 52 have deep recesses 53 at their lower ends, as shown in FIGURE 2, in a typical embodiment, and side flanges 51 are provided upon the respective legs, reinforcing the same while at the same time providing means cooperating with detents on the frame for holding the legs in collapsed or extended positions. This characteristic of the device will be described in more detail hereinafter.

It may be noted that leg 50 is provideed, substantially centrally thereof, with a generally rectangular opening 54, the material of the leg being bent inwardly at the sides and ends of this opening as shown in FIGURE 2 at 57. The spit extends through the opening 54, with the motor 40 being mounted on the outside of the leg 50, in a position such that its shaft 42 will extend through the opening.

As shown at 56, in FIGURE 7, a plurality of inwardly struck bearing sleeves is provided in each of the legs 50, 52. The sleeves 56 are arranged in pairs, the pairs being spaced vertically of the associated leg. The sleeves of each pair are aligned transversely of the leg. The sleeves of the leg 50 have been designated at 56, while the corresponding sleeves of the legs 52 have been designated at 58.

A plurality of transversely extending hanger rods, each of which is in the form of a shallow U, is provided upon the inner surface of each leg, each hanger rod being designated at 60 (FIGURE 7) and having inwardly turned trunnions or extensions 61 at its opposite extremities, engageable in selected sleeves. When viewed in cross section, each hanger rod is of right-angular shape, as shown to best advantage in FIGURE 10.

When the hanger rods are swung downwardly to their use positions shown in FIGURE 10, they define inwardly projecting, ledge-like members on the inner surface of each of the support legs or end walls of the rotisserie.

It is important to note the manner in which the legs are movable between collapsed and extended positions, and retained in said positions. Referring to FIGURE 4, at the inner ends of the side flanges 51 of the respective legs, there are longitudinal slots 64, 66 of the respective legs. Extending through the slots 64, 66 are rivets 68, providing pivot or hinge pins. As shown in FIGURE 9, the rivets are carried by the side walls 12 of the frame 10, adjacent the respective corners of the frame.

Immediately adjacent the rivets, each side wall is slit as at 70, and adjacent the slit 70, the material of the side wall is struck inwardly to provide an abutment 72 extending vertically as clearly shown in FIGURE 4. The abutment 72 is disposed in the path of movement of the flange 51, so that when the legs are in their extended, vertical positions shown in FIGURE 4, the abutments 72 extend along the edges of the flanges 51, to prevent the legs from swinging out of their assigned, upright positions.

It will be noted from FIGURE 4 that if the legs are to be collapsed, one moves the legs in a direction to cause the rivets 68 to move to the opposite ends of the slots 64, 66, that is, the ends appearing as the upper ends of the slots in FIGURE 4. The legs thus slide along the abutments 72. When the rivets reach said opposite ends of the slots, the legs are now free to swing about the pivot pins without interference from either the abutments 72 or from the adjacent end walls 14 of the frame.

It is appropriate now to consider the remaining components of the device. Designated at 74 is a drip pan (see FIGURES 2, 4 and 7) having a flat bottom wall 76, inclined end walls 78, one inclined side wall 80, and a second side wall 82 the plane of which is perpendicular to that of the bottom wall 76. The drip pan has end flanges 82 adapted to engage over opposed hangers 60, to catch drippings from a fowl or piece of meat rotating upon the spit.

A top pan has been generally designated 84, and comprises a flat body 86 provided with a continuous, upwardly struck reinforcing and retaining rib 88, disposed inwardly from a three-sided reinforcing rib 90 and a reinforcing rib 92 extending along the fourth side. Openings 94 are formed in two adjacent corners of the top pan, to permit the same to be suspended from the hooks 24 in one usage of the rotisserie shown in FIGURE 11.

The top pan has a longitudinal slot 96 along one side, and inwardly from and parallel to the slot is a tab 98 which is disposed at the underside of the top pan when the top pan is in the FIGURE 7 position.

Yet another component of the device comprises a grill generally designated 100. This comprises a plurality of straight, parallel, longitudinal rods 102, connected adjacent their ends by transverse rods 104, which are spot-welded or otherwise fixedly secured to the rods 102.

In one use of the grill (see FIGURES 4 and 7) it provides an inner side for the vertically suspended fire pan 26, and at this time, the grill would be suspended from hooks 106 provided upon the upper side of the vertically suspended fire pan. Retaining hooks 108 (FIGURE 7) are provided at the lower side of the fire pan, cooperating with the hooks 106 in holding the grill against swinging movement outwardly from its vertical position of FIGURE 7.

In a second use of the grill, it is disposed upon the inwardly directed flange 13 of the frame 10 (FIGURE 11), in a position spaced upwardly from the now horizontally disposed fire pan 26, which in these circumstances is suspended from selected hangers 60. Food can be grilled upon the grill 102 at this time.

Another grill 110 (FIGURE 2) is provided in the rotisserie, and can be used at the bottom of the pan while broiling.

Figure 12:
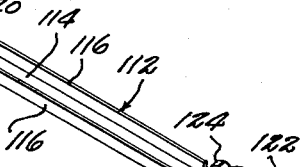
FIGURE 12 is a perspective view of a handle attachable to the grill, gravy pan, top pan, or fire pan.

Referring to FIGURE 12, generally designated 112 is a handle. This can be formed from a single length 114 of sheet metal, having reinforcing side flanges 116. At one end, handle 112 is provided with undulant forks 118, shaped to engage in suitable openings provided in the grill 100, the gravy pan, the top pan, and the fire pan, so as to permit these components to be lifted at times when they may be very dirty, greasy or hot. Reversely extending hooks 120 are also provided on this handle to facilitate grasping the mentioned articles. At the other end, handle 112 has a flat, panel-like portion 122, which at its rear end has outwardly struck hooks 124.

In use of the device, ordinarily the several components are stored as in FIGURE 2. The fire pan, being peripherally flanged, is adapted to be received in the frame 10 with its peripheral flange in engagement with the flange 13. Frame 10 and fire pan 26 thus provide a repository for the remaining components of the device. The components are stored in the order shown in FIGURE 2, it being understood that the spit and the spit handle would be disposed in the fire pan as previously mentioned.

After all the parts have been stored, the legs 50, 52 are swung inwardly in the manner previously described, into overlying relation to the several components, one of the legs overlying the other. In this connection, as noted from FIGURES 4 and 9, struck inwardly from the side walls 12 of the frame are projections 126. Leg 50 is collapsed first. Its flanges (see FIGURE 4) come to rest against the lower ends of projections 126 and right hand abutments 72, viewing the same as in FIGURE 4. The leg 52 is collapsed. Its flanges 51 rest on the left hand abutment 72, viewing the same as in FIGURE 4, and are releasably gripped by the sides of the frame 10, through the provision of cooperating detent means 127, 127a on the frame and flanges respectively.

Assuming that the device is to be placed in use, one would swing the legs outwardly to the use positions, in which positions they lock in the manner shown in FIGURE 4. Then, if one desires to suspend the fire pan at the side in the manner shown in FIGURES 4 and 5, this is done in the manner previously described, and the top pan can be placed on the top of the frame 10 as shown in these figures of the drawing. The grill 100, grill 110, and gravy pan 74 can all be positioned in vertically spaced relation, being supported upon hangers 60, and food items can be placed on all of these horizontally disposed components, to be simultaneously cooked. In this way, a large number of hamburgers, frankfurters, etc. can be cooked simultaneously.

A second mode of use is shown in FIGURE 11, in which the fire pan is horizontally disposed to permit the grilling of foods supported upon the grill 100 which is horizontally upon the frame 10. The top pan 84 might be used in FIGURE 11 on the frame instead of the grill 100, of course.

In another arrangement, shown in FIGURE 7, the top pan prevents heat from passing upwardly out of the device, while a drip pan 74 is supported upon the lowermost hangers 60. The spit is used at this time, with heat being directed laterally against the supported food from the vertically suspended fire pan.

At this time it is important to note the manner in which the spit is held in place when in use. The collapsible leg 52 has a laterally opening slot 128, the inner end of which has a circular enlargement 130 receiving ferrule 34 (FIGURE 8). The ferrule is loosely positioned within the circular enlargement, with a selected groove 37 receiving the edge of the enlargement 130.

To hold the ferrule within the circular enlargement or inner end portion of the slot, there is provided a retaining plate 132 which is pivoted upon a pin 134, and which has a lower edge formed with slots 136 adapted to receive pins 138 projecting from the leg 52 when the plate 132 is swung downwardly across the slot 128. The end of the plate adjacent the spit has a hook-like portion 140 adapted to receive a pin 142 of the leg 52. In this way, the plate holds the spit in place, but of course the plate can be swung outwardly to permit the spit to be moved out through the slot 128 whenever desired.

After the spit has been properly mounted in the manner described, handle 36 is applied thereto as shown in FIGURE 1 and is secured to the same.

Obviously, any of a wide variety of arrangements can be employed in the invention, and the cooking heat can be regulated by vertical adjustment of the fire pan to locate the same in positions suspended from any of various sets of hangers 60. Further, timing of the extent to which the food is turned upon the spit can of course be controlled, through the use of a suitable timer which may not be a part of the motor.

When the device is not in use, it can be folded into a very compact article, little greater in depth than the frame 10 and fire pan, and no greater in outer configuration than the outside area of the frame.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A portable and collapsible rotisserie comprising an open rectangular frame having vertical end walls and vertical side walls, leg plates having upper portions engaged with the inner surfaces of the end walls and lower portions extending below the frame adapted to engage a ground surface to space the frame thereabove, said upper portions having lateral flanges on their ends bearing against the inner surfaces of the frame side walls, said lateral flanges having closed vertical slots, and free vertical edges, pivots fixed to and extending inwardly from the side walls and extending through the slots, whereby the leg plates are afforded limited downward movement relative to the frame, said side walls having vertical abutments extending inwardly therefrom, said abutments being spaced upwardly from the lower ends of the slots, the free edges of the leg plate flanges being engageable with the abutments only in elevated positions of the leg plates relative to the frame, the said free edges being below and out of contact with the abutments in depressed positions of the leg plates wherein the leg plates can be swung inwardly into collapsed overlying relationship, said leg plates having pan-supporting bail brackets pivoted on their inner sides adapted to be swung upwardly to non-use positions from depressed use positions, the brackets having portions supportably engageable with the leg plates in their use positions, and a fire-pan having ends removably and supportably bearing upon brackets of both leg plates, a side wall of the frame having longitudinally spaced hooks extending therebelow, an end wall of the fire-pan having means removably engageable on the hooks for suspending the fire-pan in a vertical position below said one side wall, when removed from the bail brackets.

References Cited in the file of this patent

UNITED STATES PATENTS

| | | |
|---|---|---|
| 2,048,769 | Anderson | July 28, 1936 |
| 2,117,239 | Buechler | May 10, 1938 |
| 2,122,275 | Bitney | June 28, 1938 |
| 2,124,837 | Triolo | July 26, 1938 |
| 2,307,914 | Bitney | Jan. 12, 1943 |
| 2,335,217 | Tate | Nov. 23, 1943 |
| 2,414,490 | Speaker | Jan. 21, 1947 |
| 2,541,528 | McAvoy | Feb. 13, 1951 |
| 2,556,365 | McKnight | June 12, 1951 |
| 2,780,215 | Vacanti | Feb. 5, 1957 |
| 2,821,187 | Tescula | Jan. 28, 1958 |
| 2,826,984 | Krull | Mar. 18, 1958 |
| 2,885,950 | Stoll | May 12, 1959 |

FOREIGN PATENTS

| | | |
|---|---|---|
| 70,896 | Austria | Jan. 10, 1916 |